Dec. 5, 1944.   S. B. CRAWFORD   2,364,274
DEHYDRATING APPARATUS
Filed May 6, 1942   3 Sheets-Sheet 2
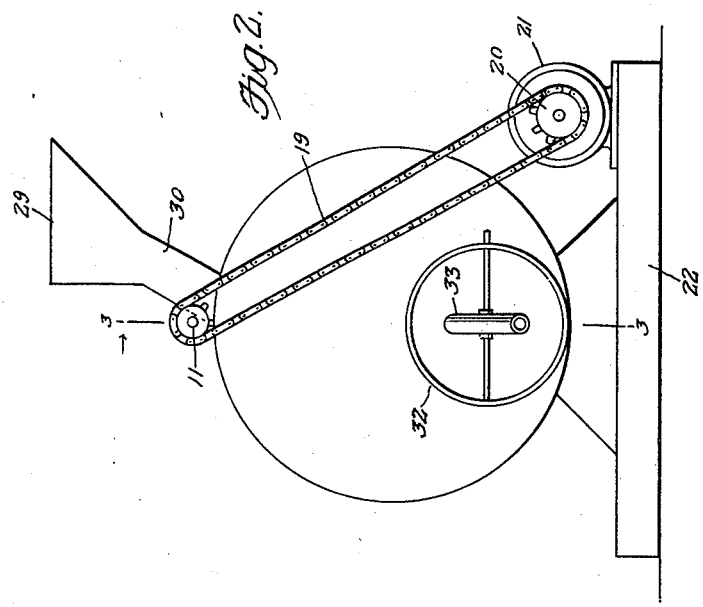
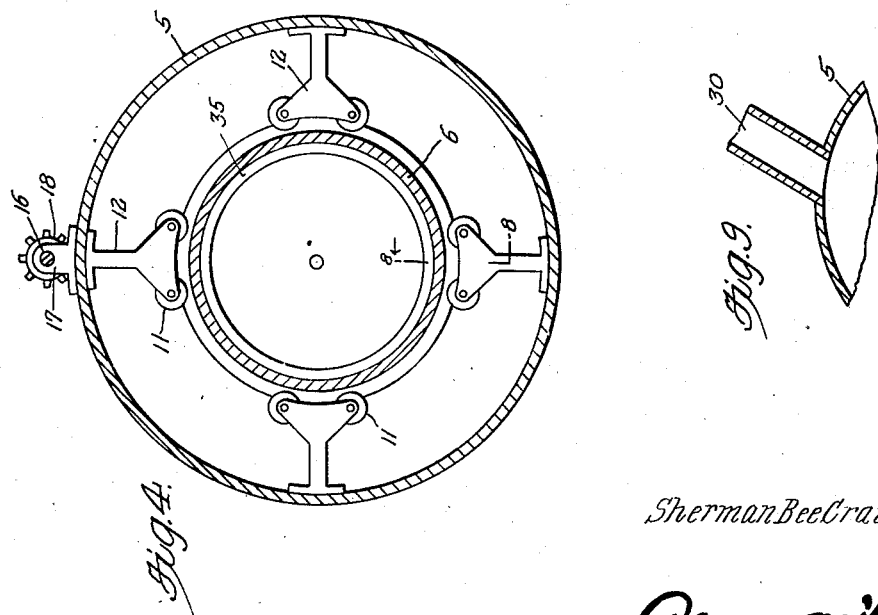
Inventor
Sherman Bee Crawford
By Clarence A. O'Brien
and Harvey B. Jacobson   Attorneys Dec. 5, 1944.   S. B. CRAWFORD   2,364,274
DEHYDRATING APPARATUS
Filed May 6, 1942   3 Sheets-Sheet 3
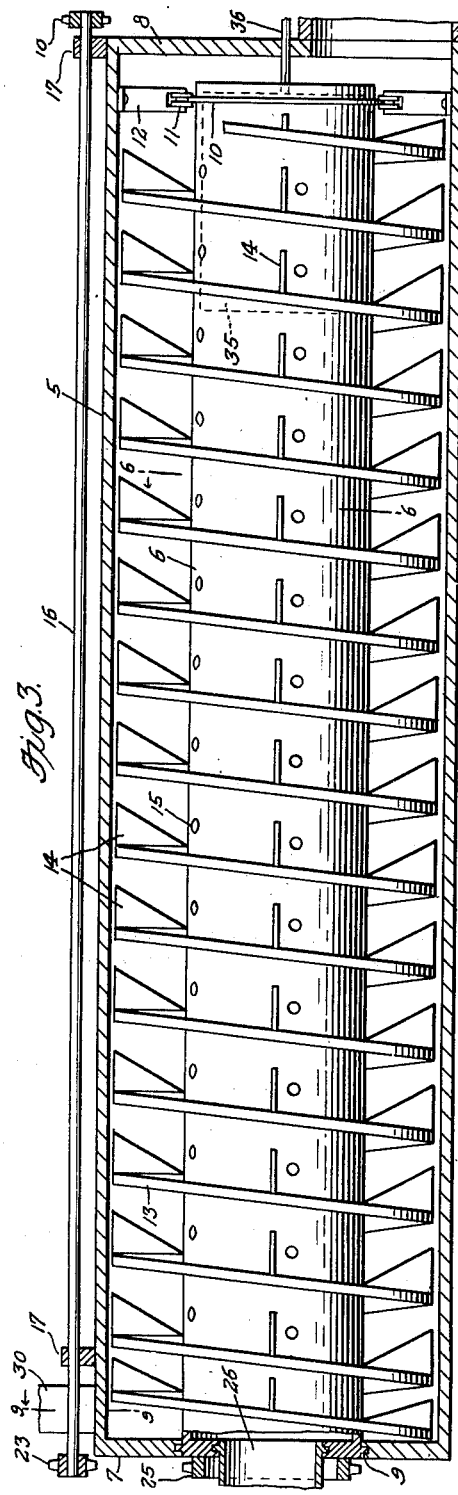
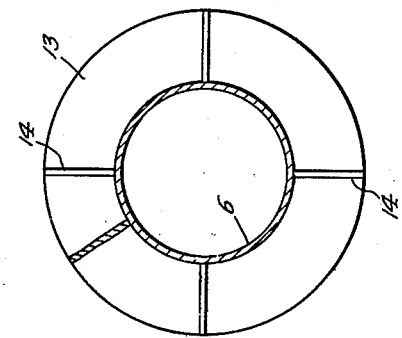
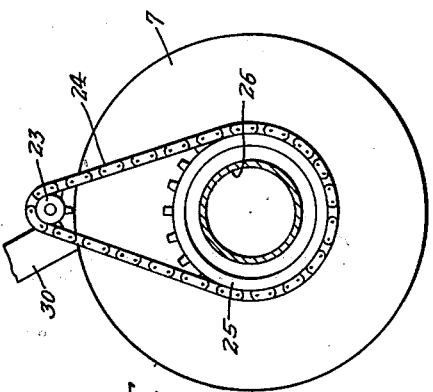
Inventor
Sherman Bee Crawford.
By Clarence A. O'Brien
and Harvey B. Jacobson Attorneys Patented Dec. 5, 1944

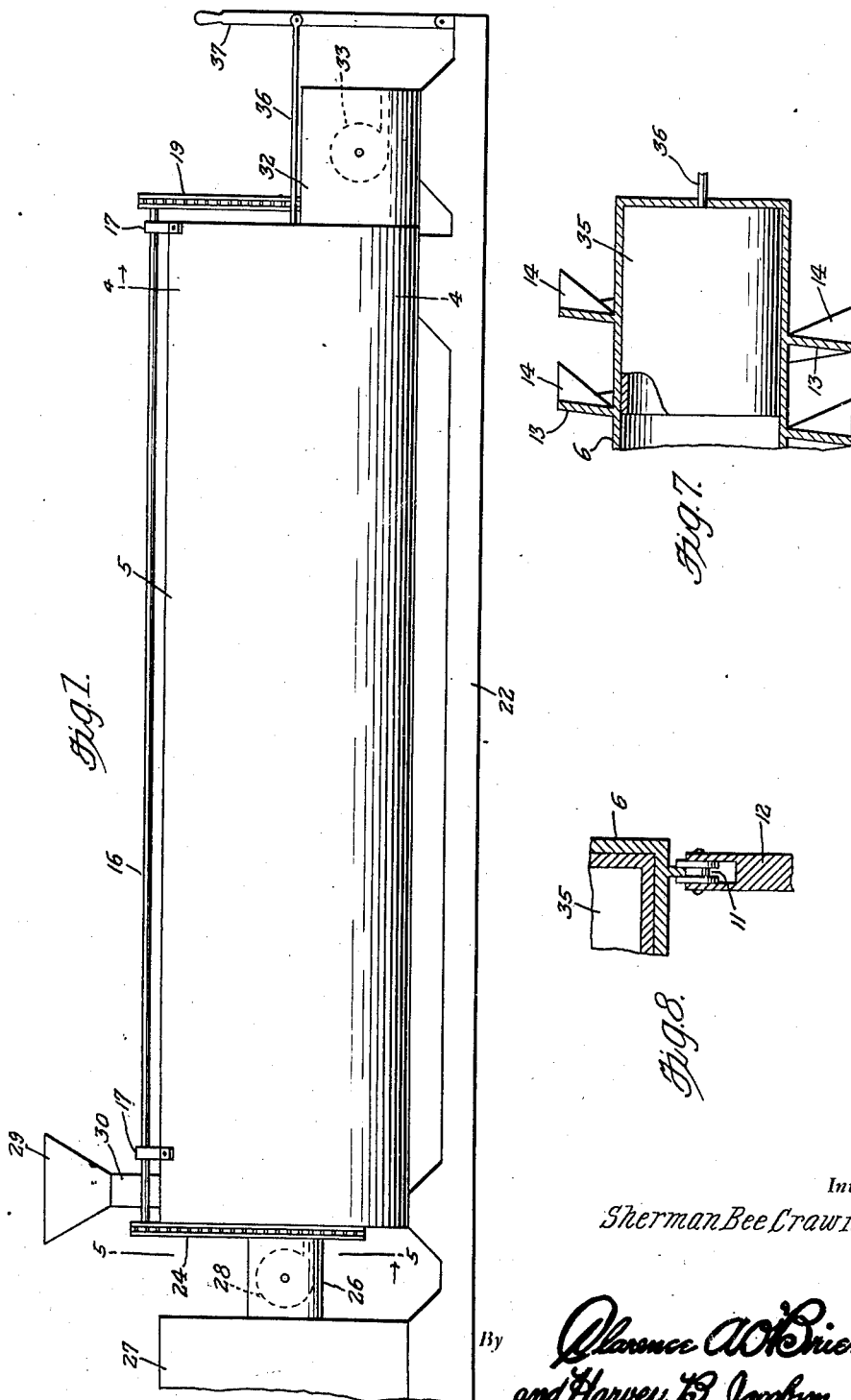

2,364,274

UNITED STATES PATENT OFFICE 2,364,274

DEHYDRATING APPARATUS

Sherman Bee Crawford, Ponca City, Okla.

Application May 6, 1942, Serial No. 442,003

1 Claim. (Cl. 34—182)

This invention relates to new and useful improvements in machines for dehydrating various materials such as alfalfa hay and similar texture product.

The principal object of the present invention is to provide a machine for applying hot air under pressure to the material while in suspension, to the end that the material is dried thoroughly and rapidly.

Other important objects and advantages of the invention will become apparent to the reader of the following description.

In the drawings:

Figure 1 represents a side elevational view of the machine.

Figure 2 is an end elevational view looking at the discharge end of the same.

Figure 3 is a longitudinal sectional view taken substantially on the line 3—3 of Figure 2.

Figure 4 is a transverse vertical sectional view taken substantially on the line 4—4 of Figure 1.

Figure 5 is a vertical sectional view taken substantially on the line 5—5 of Figure 1.

Figure 6 is a sectional view taken substantially on the line 6—6 of Figure 3.

Figure 7 is a fragmentary longitudinal sectional view through the discharge end of the rotary drum.

Figure 8 is a fragmentary detailed sectional view taken substantially on the line 8—8 of Figure 4.

Figure 9 is a fragmentary detailed sectional view taken substantially on the line 9—9 of Figure 3.

Referring to the drawings wherein like numerals designate like parts, it can be seen that the machine includes an elongated cylindrical shell 5 in which is located a rotary drum 6, the periphery of which is spaced from the circumferential wall of the shell 5. The shell 5 has end walls 7 and 8 and journaled as at 9, in the wall 7 is one end of the drum 6, while its opposite end is provided with a circumferential track 10 which rides in grooved rollers 11 supported by bifurcated arms 12 projecting inwardly from secured positions on the inside of the shell 5.

A spiral flange 13 radiates from the drum 6 and extends for the length of the drum, the periphery of this spiral flange 13 terminating in close spaced relation with respect to the shell 5, as is apparent in Figure 3. The flange 13 carries a multiplicity of fins 14 of outwardly flared construction, these fins serving to contact and hold in suspension the hay as it is fed by the spiral flange 13 the length of the drum 6. The drum 6 is formed with hot air outlet openings 15, each located adjacent a fin 14, as is clear in Figure 3.

Numeral 16 denotes a shaft disposed longitudinally along the top of the shell 5 and journaled through bearings 17, 18. One end of this shaft 16 has a sprocket wheel 18 which connects by a sprocket chain 19 with a sprocket wheel 20 driven by an electric motor 21 supported upon a base 22, which is common to the machine proper.

The other end of the shaft 16 has a sprocket wheel 23 which drives a sprocket chain 24, the latter in turn embracing a sprocket ring 26 located on the adjacent end of the rotary drum 6.

A conduit 26 extends from a furnace 27 producing hot air, and has its shell end swively connected in the adjacent end of the drum 6, so that the drum 6 may rotate independently thereof.

In the conduit 26 is a blower 28, suitably driven for forcing hot air from the furnace 27 into the rotary drum 6.

Numeral 29 denotes a hopper from which a chute 30 extends downwardly to communicate with the interior of the shell 5 adjacent the wall 7.

The other end wall 8 of the shell 5 has an outlet box or conduit 32 having a suction fan 33 therein for causing dried alfalfa hay at this end of the machine to be expelled.

Obviously, as hay enters the shell 5 from the hopper 29 and chute 30, it will be agitated by the fins 14 and slowly fed toward the opposite end of the machine by the spiral flange 13, while simultaneously being treated by hot air emanating from the openings 15.

The hay will gradually dehydrate as it moves toward the discharge end of the machine, but approaching this end, the hay becomes very hot due to its final drying stage and some suitable control is necessary at this end of the drum to regulate the output of hot air.

This hot air control means last referred to embraces a cylinder 35 slidably disposed in the drum 6 adjacent the discharge end of the machine and is intended to close certain of the openings 15 at this end of the machine or at a point toward the intermediate portion of the drum 6, by simply pushing on a rod 36 operated by a pivotal hand lever 37.

While the foregoing specification sets forth the invention in specific terms, it is to be understood that all changes in the shape, size and material, as come within the scope of the appended claim, may be resorted to without departing from the spirit and scope of the invention.

Having described the invention, what is claimed as new is:

A dehydrating machine comprising a shell provided with a material entrance at one end thereof and a treated material outlet at its opposite end, a rotor mounted in the shell and provided with a spiral blade thereon for agitating and moving material from the entrance toward the outlet, said rotor being hollow and provided with a hot air inlet at one end thereof, said rotor being formed with hot air discharge openings throughout its length and means associated with the end of the rotor adjacent the material outlet for regulating the amount of hot air passing from the rotor at this point, said means comprising a cylinder slidably disposed snugly within the said end portion of the rotor, a member extending from the cylinder and exteriorly of the shell and a lever for operating the said member and cylinder.

SHERMAN BEE CRAWFORD.